July 22, 1969  R. R. GOINS  3,456,922
BLENDING

Filed May 22, 1967  3 Sheets-Sheet 1

INVENTOR.
R. R. GOINS
BY Young & Quigg
ATTORNEYS

July 22, 1969  R. R. GOINS  3,456,922
BLENDING
Filed May 22, 1967  3 Sheets-Sheet 2

INVENTOR.
R. R. GOINS
BY Young & Quigg
ATTORNEYS

July 22, 1969   R. R. GOINS   3,456,922
BLENDING
Filed May 22, 1967   3 Sheets-Sheet 3

TUBE NUMBER   DRAIN PATTERN

INVENTOR.
R. R. GOINS
BY Young & Quigg
ATTORNEYS 3,456,922
BLENDING
Robert R. Goins, % Phillips Petroleum Company,
Bartlesville, Okla. 74003
Filed May 22, 1967, Ser. No. 640,157
Int. Cl. B01f 3/18, 5/24
U.S. Cl. 259—4                                  8 Claims

ABSTRACT OF THE DISCLOSURE

Particulate materials are blended in a vessel by withdrawing substantially unequal portions of the material from a plurality of locations by gravity tubes, each having drainholes, along the length of a confined mass of the material within the vessel, the material being withdrawn at increasing rates from the top to the bottom of the mass. The withdrawn portions are then combined and recycled if desired. This means of withdrawal is accomplished by controlling the rate of pellet flow through each drain tube so that only one of several openings in each drain tube is operating at any one point in time.

---

This invention relates to blending. In another aspect, this invention relates to a novel apparatus for blending of particulate materials.

Conventionally, the blending of a heterogeneous mass of particulate flowable solids is accomplished by establishing a bed or mass of such solids, withdrawing material from at least two different elevations in such mass or bed, mixing the withdrawn materials together and conveying the resultant mixture into an upper level in said mass or bed. This type of operation is generally termed "recycle blending." When the bed of particulate materials is only moderately heterogeneous or non-uniform, then the material may be blended by combining the above-mentioned withdrawn materials together and eliminating the recycle step.

Naturally, the more non-uniform a bed of particulate material, the greater difficulty is encountered in producing a homogeneous blend. Thus, there is constantly needed a better and improved aparatus for blending a non-uniform bed of particulate material.

Various type blending devices are known in the art whereby material is uniformly removed by gravity flow through downwardly disposed conduits at relative constant rates at a plurality of locations around the periphery of a mass of particulate materials combined in a mixing vessel. The material free flows through the conduits and is then recycled to the top of the vessel if desired. Recycle blending with these devices generally has the disadvantage caused by a composition gradient being formed along the length of the mixing vessel, resulting from the inherent gravitational flow properties of the particles within the mass. Thus, material in the upper region of the mixing vessel is more thoroughly admixed than the material in the lower region of the vessel. This invention avoids this disadvantage. Also, since the positions of the drain locations in these conduits are generally held constant the number of these locations actually draining particles will be reduced as the level of pellets within the vessel is lowered. This, of course, will result in poor sampling from the pellet bed as the vessel is emptied.

Therefore, one object of this invention is to provide a novel blending apparatus.

A further object of this invention is to provide a novel blending apparatus which results in a decreased amount of recirculation needed to provide a complete blend as the vessel is drained.

When using a blending apparatus having a plurality of downwardly disposed gravity flow conduits at least one of which has at least two gravity flow openings communicating with the interior of the apparatus, and a withdrawal means at the bottom of the apparatus, I have found that when a substantially vertical tube is maintained full of pellets above the position of an unobstructed hole in the tube, little or no pellets will enter this hole. Thus, I have found that if the flow through the conduits is directed as described above, only the top hole in any conduit in the particle bed will take pellet flow. I have termed this the "moving" or "traveling" hole principle. Consequently, as the bed level is lowered, the draining hole in each conduit is shifted. The holes in all of the conduits can then be positioned to provide for closely controlled withdrawal of particles from different levels and areas of the bed as the blender contents are being recirculated or drained. The holes can be positioned and the rate of withdrawal from each controlled, so that a non-uniform withdrawal of pellets can be made, particularly, during recycle blending in a manner that will produce a more thoroughly admixed mass.

Therefore, according to this invention, an apparatus is provided in which more efficient recycle and one pass blending operations can be carried out. The withdrawal tube areas are sized so that a greater portion of pellets can be withdrawn from the bottom region of the blending vessel for recycle blending when the vessel is maintained nearly full. The withdrawal holes within the tubes can then be spaced so that when utilizing my novel moving hole principle, either uniform or non-uniform portions can be withdrawn from the pellet bed during one pass blending and the vessel draining operation subsequent to recycle blending.

This invention can be more easily understood from a study of the drawings in which.

Figure 4A:
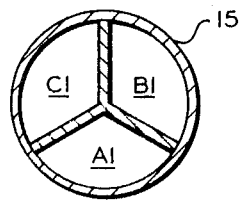
Figure 4B:
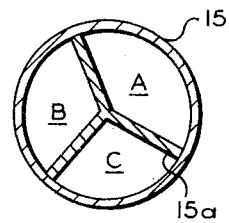
Figure 4C:
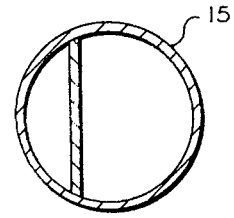
Figure 5:
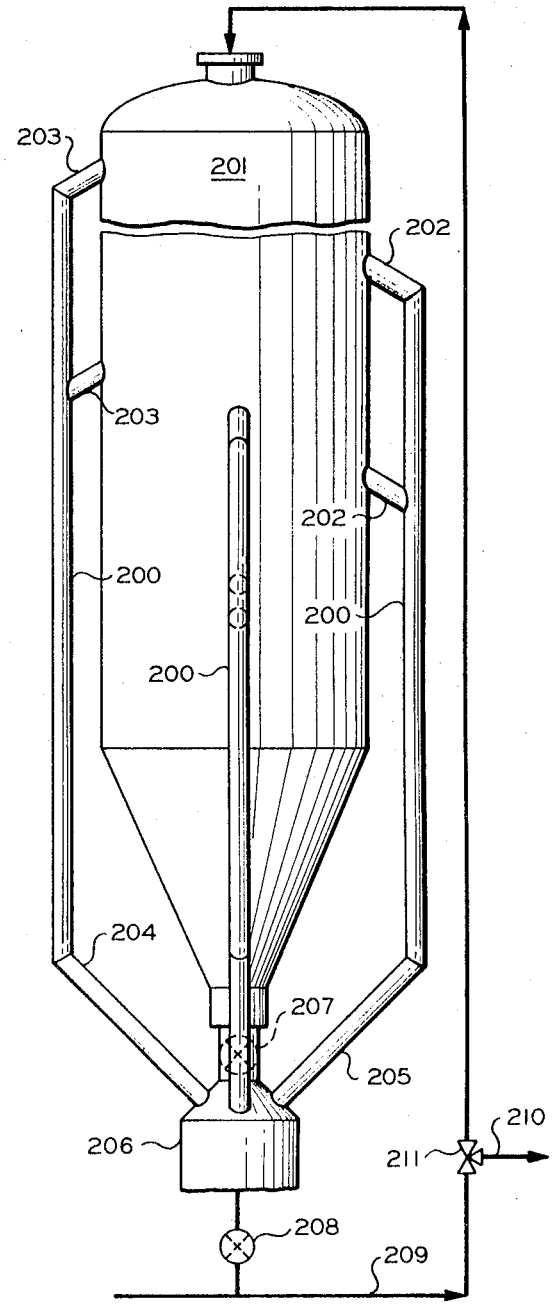
Figure 6:
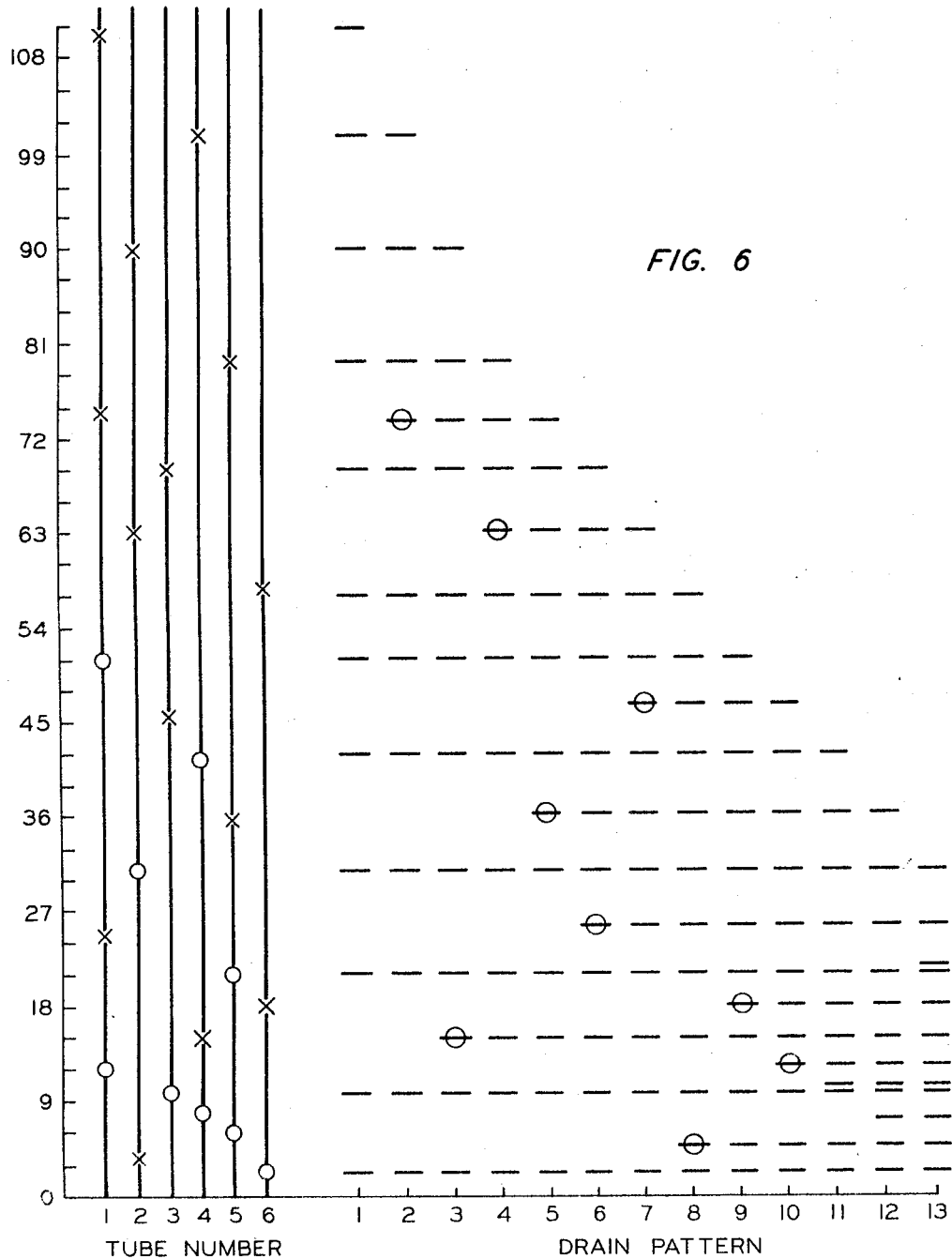

FIGURES 4a, 4b, and 4c are cross-sectional views illustrating three embodiments of this invention;

FIGURE 5 is an illustration of a blending apparatus which can be used with this invention having external upright drain tubes communicating therewith; and FIGURE 6 is a typical drain pattern using the process of this invention.

Figure 1:
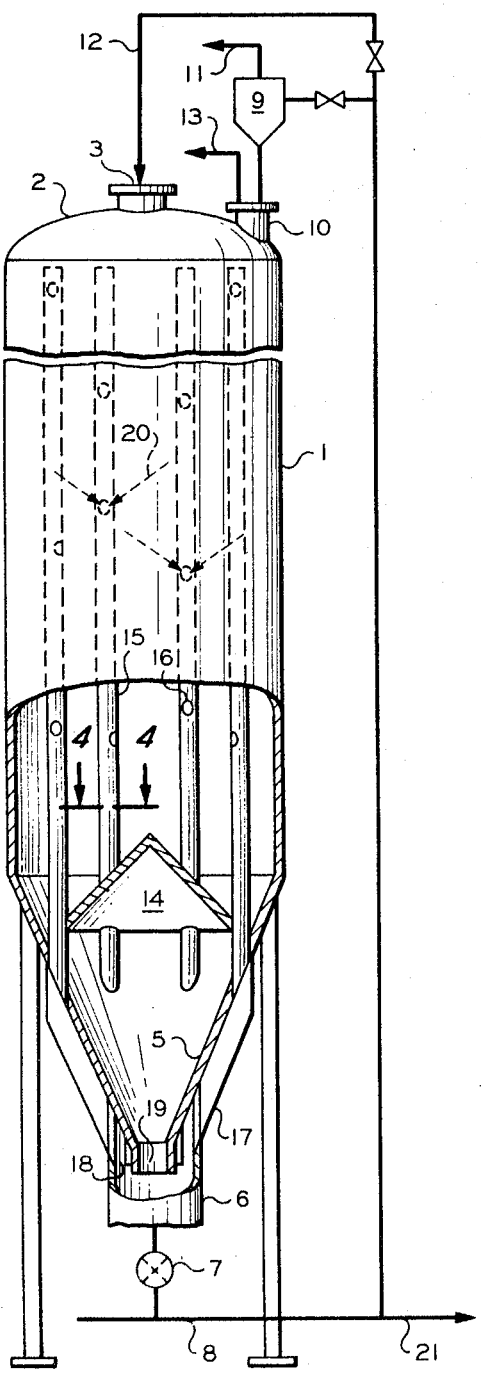
FIGURE 1 is an elevational view, partly in section, of the blending apparatus having internal upright drain tubes and a conical baffling therein.

Now, referring to the drawings, and in particular to FIGURE 1, there is illustrated a blending apparatus comprising an upright cylindrical tank 1 having a top closure 2 with a conical bottom 5 provided with an outlet 6 in which is positioned a star valve 7. Attached to the outlet 6 is a pneumatic conveyor 8 through which particulate material withdrawn from outlet 6 is pneumatically elevated into cyclone separator 9 and returned through inlet 10 into the upper interior of tank 1. Carrier gas, from a source not shown, is supplied through the inlet of pneumatic conveyor 8 and is withdrawn through outlet 11. Alternatively, cyclone separator 9 can be by-passed as by conduit 12, and the solids returned to the upper part of tank 1 through opening 3, the upper tank space acting to separate solids from carrier gas, which can escape through outlet 13. Any type pneumatic conveyor or elevator device known in the art can be used in the practice of this invention. Within tank 1 is a conical baffle member 14 spaced from tank bottom 5 and inverse to the shape thereof. Conduits 15 which will be described more fully in connection with FIGURES 4a, 4b, and 4c, have holes 16 positioned therein and are attached to the periphery of conical baffle 14 and extend through conical bottom 5. Flow passages 17 are provided, for example, by means of external conduits below the conical bottom 5 which serve to conduct the material flowing through each of the conduits 15 to annular zone 18 where it rejoins that portion of the material passing through opening 19 from around cone 14. The amount of particles flowing through annular zone 18 relative to that flowing through opening 19 is controlled by the ratio of the area of annulus 18 to the area of the central flow opening 19. This basic apparatus is illustrated in U.S. Patents No. 3,275,303 and 3,216,629.

Conventionally, when utilizing the apparatus of FIGURE 1, all of the holes 16 will take pellet flow at any one time as long as they are below the level of pellets in vessel 1. This means that all of the holes under the pellet bed, whether they be in the bottom, top or middle of the pellet bed, will be draining pellets at any one time. Therefore, as the level of pellets is lowered in vessel 1, the number of holes draining pellets will be reduced and no new drain openings are provided without the use of mechanical valving mechanisms. This invention is an improvement over the conventional mixing methods and will allow a closer control of the pellets to be withdrawn from vessel 1.

Figure 2:
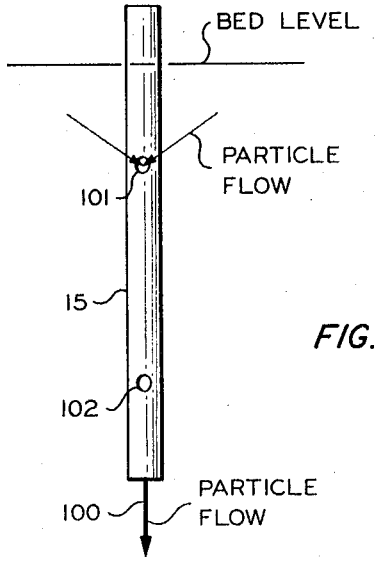
FIGURES 2 and 3 are schematic ilustrations illustrating particle flow through a drain tube in accordance with this invention.
Figure 3:
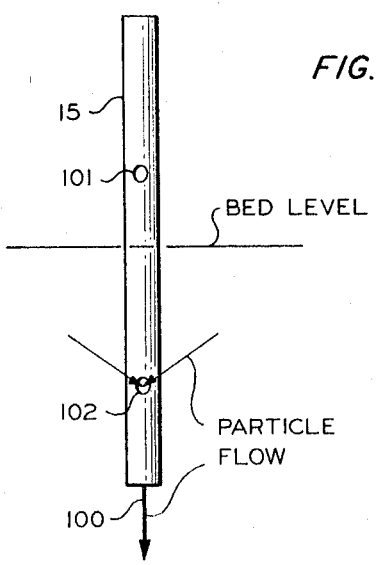

Referring to FIGURES 2 and 3, the moving or travelling hole principle will be graphically illustrated. FIGURES 2 and 3 illustrate the action of one drain tube having two drain holes within a pellet bed. As long as the flow through hole 101 is sufficient to maintain the level in the tube above hole 102, I have found that substantially none of the particles will drain through hole 102. Particle flow through hole 101 is illustrated in FIGURE 2. As the bed level drops downwardly past hole 101, then hole 102 will immediately begin draining particles therethrough. Particle flow through hole 102 is illustrated in FIGURE 3. Thus, the relative spacing of the holes on all of the conduits can provide a more closely controlled withdrawal of particles from a particulated matter bed as the bed is being emptied. The rate of withdrawal of particles from the blender is controlled by star valve 7.

Referring again to FIGURE 1, it is readily seen, from the above description that even when the vessel is ¼ to ½ full, the same number of drain holes can be operating as when the vessel is completely full. Also, it is preferred that the diameter of each hole 16 be sufficiently large so that the hole does not act as an orifice under the usual conditions of particle flow. Holes 16 can be made by making V-shaped cuts in conduit 5, drilling holes therein, or any other suitable method.

Referring again to FIGURE 1, directional arrows 20 indicate the angular flow of pellets through holes 16. Thus, as illustrated, the pellets flow to each hole 16 from a level higher than the respective hole and at an angle (angle of slip) which is greater than the angle of repose of the particles. It is well known that the angle of repose of particulate matter varies with the surface properties and configuration of the individual particles but normally ranges from 30 to 40° whereas the angle of slip which is the angle at which the particles will flow is greater than the angle of repose and normally ranges from 50 to 70°. Therefore, when equal portions of particles are withdrawn from along the length of the bed and then combined and recycled to the top of the blending vessel, due to this angle of slip phenomenon, there results a greater removal of particles near the top of the bed than in the lower portions thereof and, consequently, a greater sampling of particles near the top of the bed than in the lower portions thereof. Therefore, when recycle blending, it is desirable to withdraw greater portions from the lower areas of the bed than from the top areas of the bed. When greater portions of pellets are withdrawn from the lower areas of the bed than from the higher areas of the bed, the average particle will migrate through the length of the bed at a much higher rate and as a result, a more thoroughly mixed bed will be formed. Also, during recycle, the pellets returned to the top of the bed are fairly well mixed since they result from pellets sampled from the different vertical positions within the bed. It is therefore not necessary to recycle large quantities of these pellets. Blending of these pellets will be completed as more are recycled or as the vessel is drained.

FIGURES 4a, 4b, and 4c are cross-sections of conduit 15 taken along lines 4—4 of FIGURE 1, to illustrate the improved apparatus of this invention. In FIGURES 4a and 4b, conduit 15 comprises a conduit shell with a 3-membered partition 15a connected therein to form three sub-conduits, each sub-conduit having one or more drain holes communicating therewith. Conduit 15 can either be formed by molding or by extruding a partitioned conduit or by inserting partition 15a into a conventional conduit. It has been found that a partitioned conduit, especially one that has been molded or extruded, is much stronger and durable than, for example, three smaller conduits. The drain holes through the smaller conduits result in a larger portion of the circumference at any one point being weakened than in a corresponding partitioned conduit. Therefore, the partitioned conduits result in a much stronger ad durable structure than a corresponding number of smaller conduits. The partitions in the conduits end at a point near the bottom of the tube so that there is sufficient vertical height in the tube below the partition to induce uniform flow downward in the tube at the point where the partitions end. This required height is on the order of two tube diameters. As illustrated, in FIGURE 4b, area A is greater than area B which in turn is greater than area C. Therefore, when utilizing my "moving hole" drainage principle, the top hole in section A is placed lower than the top hole in section B which, in turn, is placed lower than the top hole in section C. This results in a greater withdrawal of pellets from the lower holes in the bed and, consequently, produces a more uniformly mixed bed within vessel 1 in a smaller number of cycles of blending. The same result can be accomplished with an equally partitioned tube as illustrated in FIGURE 4a by causing the discharge area from section area A1 (between the lowest hole and the bottom of the sectioned tube) to be greater than the discharge area from section B1 which, in turn, is caused to be greater than the discharge area from section C1. It must be noted that the discharge openings from areas A1, B1 and C1 can be equal to provide equal flow through all three sub-conduits. Also, FIGURE 4c illustrates a tube with a single partition postioned therein to provide unequal particle flowing areas.

FIGURE 5 illustrates a blending apparatus having external drain tubes communicating therewith. This apparatus is similar to the apparatus of FIGURE 1 except that no internal baffles arecontained therein and external drain tubes 200 are utilized instead of the internal conduits 15. It may be noted that this invention is also adaptable to the use of internal tubes disposed therein. Each external drain tube 200 is shown having a plurality of discharge openings communicating with the interior of the vessel 201. The angle from the horizontal at which the inclined tubes, 202 and 203, meet the vessel wall, is at least equal to, preferably greater than, the angle of (repose) of the particles within vessel 201 so as to permit free flow into drain tube 200. The points of entrance of inclined chain conduits 204, 205 et al. connecting tubes 200 with collector vessel 206 are non-symmetrically disposed so that the flowing ratios of particles withdrawn from the various levels are the particle bed may be controlled in a manner similar to that described above. Vessel 206 communicates with the bottom of vessel 201, and the flow of particles from the bottom of vessel 201 is controlled by valve 207, or the relative flows may be regulated by other known techniques.

Similarly, each drain tube 200 communicates with vessel 206. The rate of withdrawal of pellets from vessel 206 can be controlled by valve 208 into pneumatic line 209. The particles from vessel 206 can be recycled to the top of vessel 201, or withdrawn via conduit 210 in response to the position of valve 211 if desired. This illustration is given to show that the moving hole principle can be applied to an apparatus used for blending whether the blending conduits or tubes be internally positioned or externally positioned. It should be noted that the vessel and drain tube constructions illustrated can be readily cleaned after use.

The following examples are given solely to illustrate this invention and are not intended to unduly limit the scope thereof.

Example

This test was run with a cylindrical blender similar to the apparatus in FIGURE 1 having a 3.5 foot diameter and being 10 feet in length with a 60° cone bottom. Six blending tubes were utilized, each being divided into two equal parts. A total of 23 holes therein were available for receiving flow. Each hole presented a flow area of 1.75 square inches (approximately 1½ inches in diameter). These tubes were similar to the tubes illustrated in FIGURE 4c except that equal areas were used, i.e., the baffle divided the tube into two equal drain areas. However, the bottom of the dividing baffle was bent to one side so that ⅔ of the flow through the entire tube came from one side of the tube and ⅓ of the flow through the entire tube came from the other side of the tube. The holes in the ⅔ flow area communicated with the lower portions of the blender and the holes in the ⅓ flow area communicated with the upper portions of the blender. These holes in the 6 drain tubes were positioned as illustrated in FIGURE 6. This typical drain diagram will be explained in detail below. An inverted cone baffle, of approximately ⅔ of the tank diameter, located in the conical bottom of the tank, was used, and 22 percent of the flow from the blender passed around the baffle through opening 19 and was consolidated in outlet 6 with the flow from the tubes from conduits 17 and annular area 18 for recirculation and/or withdrawal.

The test was performed by loading 3,000 pounds of ⅛-inch diameter polyethylene cylindrical pellets ³⁄₁₆ inch long to the top of the tank with an air transport system. Sufficient colored pellets were added to the top of the bed in the blender to average 25 colored pellets per pint of pellet sample. Pellets were withdrawn from the blender at a rate of 1,000 pounds per hour and recycled from the bottom of the tank to the top for a sufficient time to equal one and one-half cycles (4,500 pounds total) of recirculation.

The pellets were drained from the blender after recycling and a 1-pint sample, taken every 50 pounds for a total of 60 samples. As will be shown in the drain diagram of FIGURE 6, only 12 holes of operating (pellets flowing through) at any one time during recirculation. As the pellets were drained, the flow shifted from one hole to the other so that even when the blender was less than ½ full, pellets ware still being drained from 12 holes.

Now, referring specifically to FIGURE 6, the six vertical lines represent the six tubes in the blender which were arranged in the order shown around the inside of the blender. The bottom O-section hole of tube 6 was approximately at the level of the cylinder-cone intersection and the top X-section hole of tube 1 was approximately 10 inches below the top of the blender.

The X's represent the location of holes that drained through the small side of the divided tube and the circles represent the location of holes that drained through the large side of the tube. Since the top X holes were located above the top circle holes, about twice as much flow was taken from the bottom holes (circles) as from the top holes. This increased flow through the bottom holes speeded up the blending during recirculation as has been previously described.

As the blender was being drained, the pattern of drainage holes changed. The drain pattern to the right of the hole pattern shows how this operated. The first drain pattern shows the hole drainage as the pellets were being circulated when the blender level is equal to or above the top hole in the tubes. Thus, drain pattern 1 includes only the top holes in each of the 12 tube sections. The holes that were draining pellets are shown by a horizontal dash at the same level as the particular drainage hole. Thus, the pattern shows drainage from almost equally spaced vertical intervals in the bed.

As the blender was being emptied through the bottom drain, the pellet level dropped below the top X hole in tube 1. When this happened, pellets then started draining through the next X hole down. This is shown in drain pattern 2 with a circle around the horizontal dash which indicates this is the first time this particular hole operated in the drain pattern.

As the pellet level dropped below the top hole in tube 4, pellets started draining through the next X hole down which was near the bottom of the tube. This is indicated by the circle around the horizontal dash in drain pattern 3.

The drain pattern kept changing as the bed level dropped so that at drain pattern 10, with the bed level well below the halfway mark, there were still 12 holes draining pellets and they were well spaced in the bed.

As the bed level dropped still lower, below the last hole in one of the tubes, the hole in the adjacent tube picked up the added volume of flow and the same total flow continued. This is shown in drain pattern 11.

In blenders with 18 tubes, the drain pattern, with a full complement of drain holes is maintained until the blender is only one fourth full.

As the bed level falls below all the holes in one of the tubes, drainage can be switched so as to drain pellets from the area below the cone baffle. This modification will allow a wide design diversification to achieve a desired drain pattern.

By varying the hole placement, the drain pattern can be changed to concentrate the drainage in whatever area of the tank is desired.

For instance, by placing the holes closer together toward the bottom of the blender pellet flow can be concentrated (or increased) in the lower sections of the blender even with equal flows through each of the tube sections.

In the test performed by the blender of FIGURES 1 and 6, and under the conditions stated above, colored pellet count ranged from a low of 13 to a high of 44. Statistical analysis has shown that even for perfect results, only 95 percent of the pellet count of the 60 samples (57 in this case) should have been between 15 and 35. In this case, only 4 counts were outside this range, 13, 39, 38 and 44. Thereby, the ratio of the actual variance to the theoretical variance was 1.65. The variance is actually a measure of the average of the square of the distance of the individual pellet counts from the predicted 25 pellets.

It was found that the ratio has a normal variation from a little over 1 to almost 2. Thus, any values between these would be considered identical. It was found that even for so-called perfect blends, this ratio has a normal variation from about 1 to about 1.75. Additionally, in subsequent runs there was found no further decrease of the ratio with additional recycle—even up to 5 cycles. Furthermore, the pellets from the test run of Example 1 (recycle 1½ times) were reblended in a double cone blender. It was found that there was no additional improvement in the blend.

Differences in density, size, shape or static charges could have caused some of the deviation of the actual from the theoretical since these differences in properties could have resulted in some segregation during recycle. This would not normally occur when the blender is used to homogenize pellets having substantially no differences in physical properties.

As will be evident from a reading of this disclosure, various modifications can be made of this invention without departing from the scope thereof. Therefore, the embodiments illustrated in the drawings and described in the specification are not intended to be limitative thereof.

I claim:
1. Solids blending apparatus comprising:
   (a) a chamber having an inlet and an outlet at substantially opposite ends thereof;
   (b) at least one gravity flow conduit having a discharge opening and at least two spaced openings communicating with the interior of said chamber, the upper spaced opening communicating with the upper region of the interior of said chamber;
   (c) at least one gravity flow conduit having a discharge opening of larger cross-sectional area than the discharge opening of the conduit(s) of (b) above and at least two spaced openings communicating with the interior of said chamber, the upper spaced opening communicating with the lower region of the interior of said chamber; and
   (d) collection and withdrawal means communicating with said outlet and said discharge openings.

2. Apparatus of claim 1 further comprising concave baffling means in said chamber spaced adjacent the outlet thereof and spaced from the wall of the chamber so as to provide a first passageway for solids around said baffling means.

3. Apparatus of claim 2 wherein said conduits are positioned in said vessel with the spaced openings thereof above said baffling means, and positioned to provide second passageways for solids around said baffling means through said conduits.

4. Apparatus of claim 1 wherein said conduits comprise a series of tubes, each having at least one partition extending longitudinally therethrough to provide at least two longtiudinal passageways, and at least two of said openings communicate(s) with at least one of said passageways in each of said tubes.

5. Apparatus of claim 4 wherein the cross-sectional areas of the longitudinal passageways of each of said tubes are equal except at the discharge openings.

6. Apparatus of claim 4 wherein the cross-sectional areas of said longitudinal passageways of each of said tubes are unequal.

7. Apparatus of claim 1 further comprising at least one gravity flow conduit having a discharge opening of greater cross-sectional area than (b) above but of smaller cross-sectional area than (c) above and at least two spaced openings communicating with the interior of said chamber, the upper spaced opening communicating with the intermediate region of the interior of said chamber.

8. Apparatus of claim 6 wherein said conduits comprise a plurality of tubes, each having three partitions extending longitudinally therethrough to provide three longitudinal passageways, said longitudinal passages representing the individual flow conduits.

References Cited

UNITED STATES PATENTS 3,216,629  11/1965  Goins _____ 259—180 X

FOREIGN PATENTS 1,379,212  10/1964  France.

ROBERT W. JENKINS, Primary Examiner

U.S. Cl. X.R.

259—180

UNITED STATES PATENT OFFICE
CERTIFICATE OF CORRECTION

Patent No. 3,456,922  Dated July 22, 1969

Inventor(s) Robert R. Goins

It is certified that error appears in the above-identified patent and that said Letters Patent are hereby corrected as shown below:

Column 1, line 4, should read -- Bartlesville, Okla. 74003, assignor to Phillips Petroleum Company, a corporation of Delaware --.

SIGNED AND
SEALED
APR 28 1970

(SEAL)
Attest:

Edward M. Fletcher, Jr.
Attesting Officer

WILLIAM E. SCHUYLER, JR.
Commissioner of Patents